Sept. 30, 1924.
C. A. GORDY
CAN PERFORATOR
Filed March 14, 1923
1,509,867
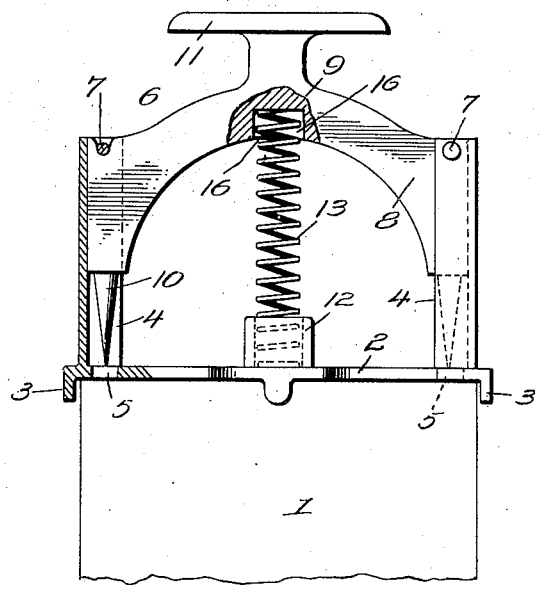
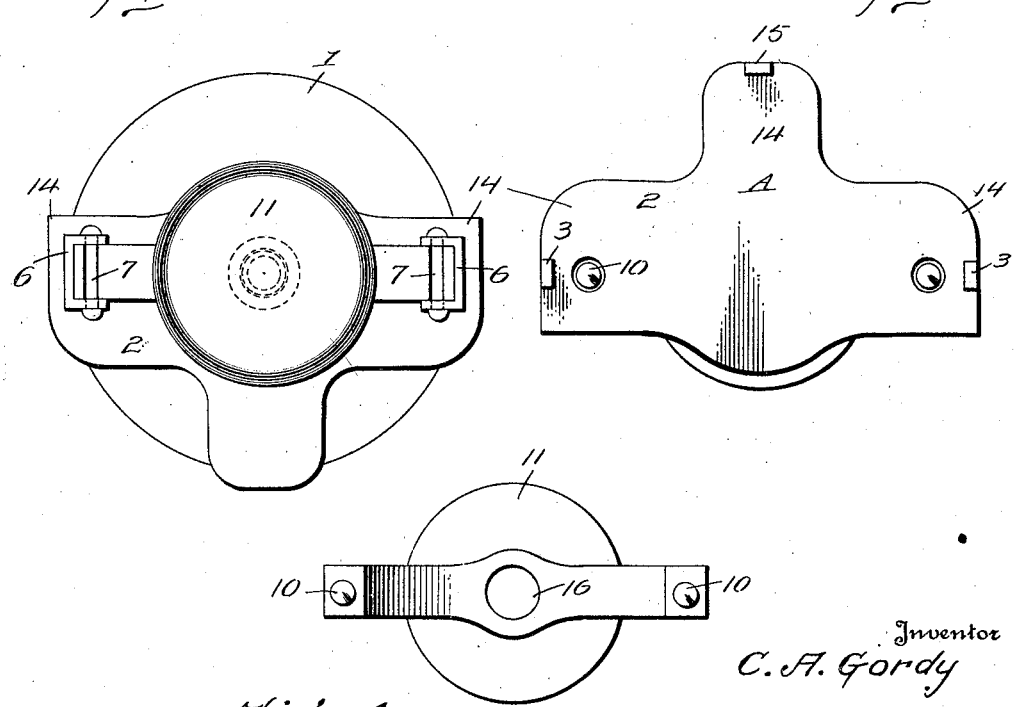
Inventor
C. A. Gordy
By Geo. P. Kimmel
Attorney Patented Sept. 30, 1924.

1,509,867

UNITED STATES PATENT OFFICE.

CHARLES A. GORDY, OF HANFORD, CALIFORNIA.

CAN PERFORATOR.

Application filed March 14, 1923. Serial No. 625,150.

*To all whom it may concern:*

Be it known that I, CHARLES A. GORDY, a citizen of the United States, residing at Hanford, in the county of Kings and State of California, have invented certain new and useful Improvements in Can Perforators, of which the following is a specification.

This invention has reference to can perforators, and is intended to produce spaced perforations in the top of a can, particularly an evaporated cream can, whereby the contents of the can may be readily poured out of the can for use.

The contents of evaporated cream cans are usually of semi-liquid consistency, being formed of milk or cream evaporated to about one-half of the water originally contained in the milk or cream, and consequently such contents are semi-thick but will flow from the can provided there are two holes on opposite sides of the can, one for the escape of the contents of the can and the other for the entrance of air.

The cans of evaporated cream have their contents fairly flowable and it is the object of the invention to produce at a single operation, two holes in the top of the can to facilitate the flow of milk therefrom when needed with the holes so small as to guard against the ready contamination of the milk or cream so that the contents of the can will remain sweet for a considerable time, thus permitting the can of milk to be used up without harm to such contents.

In accordance with the invention, there is provided a frame or yoke adapted to rest on the top of the can and extend diametrically thereof and also provided with a radial extension whereby there are formed three legs equidistantly disposed and arranged to encircle the top of the can thus giving ample support for the device.

There is provided in conjunction with the body of the device, a slide extending diametrically of the can and provided with piercing points at opposite sides while the point carrying structure is upheld with relation to the top of the can to be pierced by means of a spring in conjunction with guides directing the piercing member of the device. Moreover provision is made for guiding the piercing member so that it maintains a substantially perpendicular position with reference to the main body of the structure, thus ensuring a direct piercing of the top of the can close to the edges thereof and resulting when a blow is delivered to a convenient handle provided for the purpose, the piercing points will enter and pass through the top of the can to the interior thereof and produce the required holes, one of which may be used for permitting the escape of the contents of the can and the other of which will admit of the entrance of air to prevent the establishment of vacuum conditions, facilitating the flow of milk from the can.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claims.

In the drawings:

Figure 1 is a view partly in elevation and partly in section showing the can piercing structure in position to be forced through the top of the can.

Fig. 2 is a plan view of the structure of Fig. 1.

Fig. 3 is an inverted view of the structure of Figs. 1 and 2.

Fig. 4 is an inverted view of the can piercing element removed from the body of the device.

Referring to the drawings, there is shown in Figs. 1 and 2, a can 1, which may be taken as typical of a metal can used for evaporated cream such as is obtainable on the market.

There is provided for use in connection with the can 1, a piercing device A comprising a plate 2 of a length and width to extend diametrically with respect to the can 1 and beyond opposite edges thereof.

In order to center the plate 2 with respect to the top of the can, there are provided at diametrically opposite sides of the top 2, downwardly extending lugs 3 having a somewhat greater separation than the diametric width of the can.

Resting on the top of the plate or base 2 of the structure and coincident with but at somewhat greater spacing than the extreme edges of the plate 2, are hollow posts 4 standing upright and coincident with perforations 5 through the plate 2.

The posts 4 have open upper ends 6 each traversed by a pin 7. The posts 6 carry the parallel end legs 8 of a reciprocatory yoke member 9 which legs are provided at their lower ends with piercing members 10 which may be of pointed conformation so as to readily pierce the top of the cam located thereunder.

At the central portion of the yoke 9 there is located an expanded handle part 11, between which and a socket 12, there is located an expansion spring 13 tending to hold the yoke 9 up against the pins 7, in which position the points of the piercing members 10 are above the top of the plate 2 and ready, on depression, to enter and pierce the top of the can 1.

The plate 2 is formed with a side extension 14 at right angles to the diametrically opposite members of the plate 2, the said members 2 of the plate, and the member 14 thereof constituting a tripod with the member 14 having a lug 15 equidistant from the lugs 3.

The spring 13 is lodged at the upper end in a socket 16 and at the lower end within another socket 12 serving to guide the spring in the movements of the yoke 9 up and down.

When it is desired to pierce the top of the can, the cover or plate 2 is adjusted over the top of the can, being guided by the lugs 3 and 15 to centralize therewith. In the meantime, the yoke 9 is held in the uppermost position against the pins 7 by means of the spring 13, and then the operator by delivering a blow to the handle 11, is able to overcome the resistance of the spring 13 and cause the pointed members 10 to engage and pass through the top of the can, producing holes therein, the spring 13 having sufficient power to lift the yoke 9 to an extent to withdraw the piercing points 10 from the can, and then the entire structure may be lifted from the can, being free from attachment thereto.

There is thus produced, two diametrically oposite holes through the top of the can, one permitting the escape of milk when the can is inverted, and the other admitting air to break the vacuum formed in the can by the outflow of milk.

The piercing structure is very readily applied to and centered on the top of the can so that the holes caused by the piercing members 10 are located close to the inner margins of the can whereby the milk or cream may be poured from the can without liability of spilling thereof.

The can piercing device is particularly adapted to the piercing of the tops of evaporated cream cans, but it is to be understood that it may be used in connection with other cans where it is desired to obtain the contents thereof through relatively minute passages, the device being particularly advantageous in obtaining the flow of evaporated cream from a can thereof.

What is claimed is:—

1. A perforating device of the character described comprising, a plate having centering means extending from one side and further having apertures therethrough, spaced vertical channeled guide posts carried by said plate, a yoke member having its extremities slidable in said posts, piercing means carried by said extremities in alinement with said apertures for passage therethrough and normally housed in said posts, and means for retaining said yoke and piercing means in retracted position.

2. A perforating device of the character described comprising, a plate having a plurality of centering lugs extending from one side at the edge thereof and further having spaced apertures therethrough, spaced channeled guide posts integral with and extending at right angles from the other side of said plate, a yoke member connecting said guide posts and having its ends slidable therein, piercing means carried by said yoke in alinement with said apertures, and means normally tending to remove said piercing means from said apertures.

3. A perforating device of the character described comprising, a plate having centering means extending from one side at the edge thereof and further having spaced apertures therethrough, spaced channeled guide posts integral with and extending at right angles from the other side of said plate, a yoke member connecting said guide posts and having its ends slidable therein, piercing means carried by said yoke in alinement with said apertures and normally housed in said channeled posts, and an expansible spring between the top of said plate and the underside of said yoke and normally tending to force said yoke outwardly from said plate.

4. A perforating device of the character described comprising, a plate having formed upon its underside lugs for centering the same, vertical spaced inwardly opening channeled guide posts integral with the upper side of said plate, said plate being provided with a pair of apertures each opening into one of said channeled posts, a yoke member having its terminals formed to provide vertical parallel legs slidably held in said channeled posts, a piercing member carried at the lower end of each leg and adapted to traverse an aperture, spring means normally forcing said yoke upward to hold said piercing members poised above said apertures, and a pin extending transversely of said channeled posts at the upper ends thereof to limit the upward movement of the said yoke.

5. A perforating device of the character described comprising, a plate having formed upon its under side lugs for centering the same, vertical spaced inwardly opening channeled guide posts upon the upper side of said plate, said plate being provided with a pair of apertures each opening into one of said channels, a yoke member having its terminals formed to provide vertical parallel legs slidably held in said channels, a piercing member carried at the lower end of each leg and adapted to traverse an aperture, means to provide a pocket centrally of said plate, and an expansible spring having one end in said pocket and the other end engaging the under side of said yoke and normally forcing the same upward away from said plate.

In testimony whereof, I affix my signature hereto.

CHARLES A. GORDY.